April 24, 1928.  
J. WERNIS  
CAR COUPLING  
Filed April 2, 1927

1,666,954

INVENTOR.
Joseph Wernis.
BY
ATTORNEY.

Patented Apr. 24, 1928.

1,666,954

UNITED STATES PATENT OFFICE.

JOSEPH WERNIS, OF DETROIT, MICHIGAN.

CAR COUPLING.

Application filed April 2, 1927. Serial No. 180,352.

My invention relates to a new and useful improvement in car couplings, particularly adapted for use on mine cars, and has for its object the provision of a coupling of this class which will be simple in structure, economical of manufacture and highly efficient in use.

Another object of the invention is the provision of a car coupling which may be cheaply manufactured on a mine car, and of such durable structure as to withstand the usage to which it is put, while at the same time, it will be universally adaptable to the various purposes required of it in this use.

Another object of the invention is the provision of a coupling swivelly mounted so as to swing into various positions and provided with a spring for retracting it in its housing.

Other objects will appear hereinafter.

The invention consists in the combination and arrangement of parts hereinafter described and claimed.

The invention will be best understood by a reference to the accompanying drawings which form a part of this specification, and in which, Fig. 1 is a central, vertical, sectional view of the invention showing it applied to a car.

Figures 2, 3:
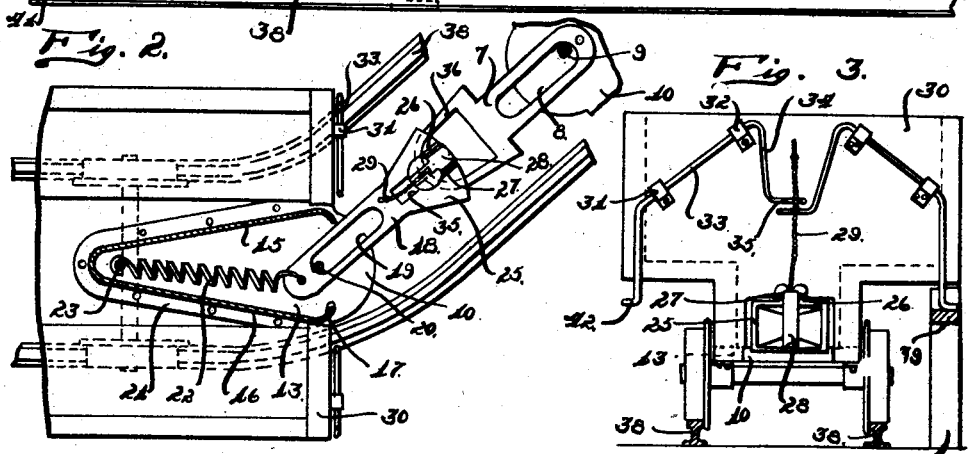
Fig. 2 is a top plan view in fragment of the invention with a part broken away and a part shown in section.
Fig. 3 is an end view of a car embodying the invention.

The coupler comprises a link 7 provided with the elongated slot 8 in which engages the securing pin 9 mounted on the forward portion 10 of a car with which used. A spring 11 is attached at one end to one end of the link 7, and at its opposite end to the bolt 12 which projects through the floor 13 of the car and through the top 14 of a housing. As shown in Fig. 2, this housing has diverging side walls 15 and 16 which are cut away as at 17 to permit proper swinging movement of these parts. The housing shown in Fig. 2 is used on a cooperating link 18 but the housing used in connection with the link 7 is of the same structure, and therefore a description of one may apply to the other. The link 18 is provided with an elongated slot 19 through which extends a bolt 20 passing through the floor 13 of the car and through the top 14 of the housing. The side walls of the housing are provided with a flange 21 which is attached to the floor 13. A spring 22 is secured at one end to one end of the link 18, and at its other end to the bolt 23 extending through the floor 13 and through the top 14.

The free end of the link 18 is provided with a pyramidal shaped housing 25, projecting upwardly from which are lugs 26 and 27, pivotally mounted between which is an L-shaped locking pin 28, the upper end of which is attached to a cord or chain 29, the other end being secured to the end wall 30 of the car. Rockingly mounted by means of clips 31 and 32 on the end wall 30 of the car is a rod 33 having its end 34 angularly turned and provided with the angularly turned portion 35' adapted to lie behind the fastening member 29. The structure is such that upon a rocking of the rod 33 in its mountings, the chain or cord 29 will be engaged and the member 28 rocked at its pivot, swinging it inwardly of the housing 25, and raising it upwardly so as to engage in the slot 35 formed in the upper wall of the housing 25, thus disengaging from the eyelet 36 on the end of the link 7.

Figure 4:
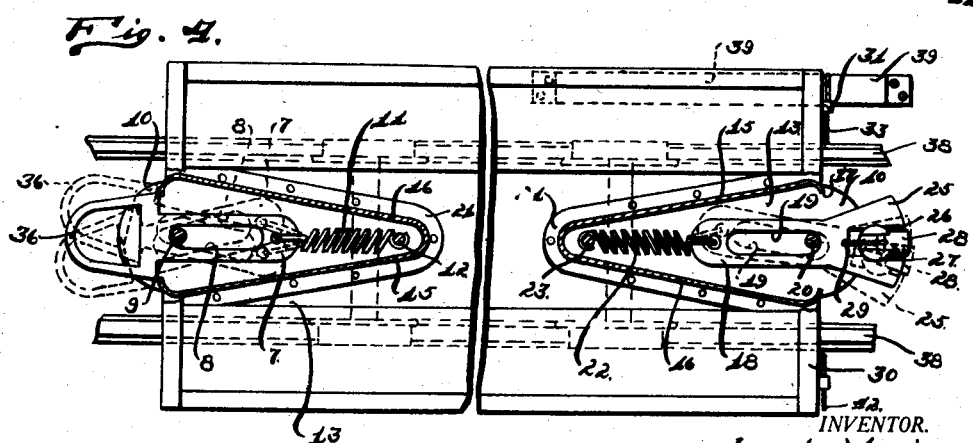
Fig. 4 is a top plan view of a car showing the invention applied thereto.

When it is desired to engage the eyelet with the member 28 the eyelet is inserted into the housing 25, rocking the member 28 on its pivot so that the free end thereof will engage in the slot 35. When the end of the eyelet has passed beyond the end of the member 28, this member 28 will fall by gravity into the eyelet, thus locking the members together. The links 7 and 18 are swingably mounted as clearly appears from Fig. 4. In addition to being swingably mounted they are longitudinally movable, the engagement of the bolts 20 and 24 in the slots 19 and 8 respectively permitting this movement. When the cars are used for drawing each other, the springs will be placed under tension until the bolts 24 and 20 engage in the ends of the slots so that a floating movement of these connecting links is provided, this movement permitting the relative approach and withdrawal of the cars while in motion, without disturbing the connecting means. In this manner, a sudden strain exerted upon the member 28 is eliminated, and a sudden draw exerted thereon, thus rendering the part which is most likely to be broken, relieved of any sudden strains and jars.

In the use of mine cars it is desirable that the cars be released from the train individually for movement on to the cage. In common practice it is necessary to employ a person for releasing the cars from the train, and in the present invention I have provided a device for automatically taking care of this matter.

Figure 1:
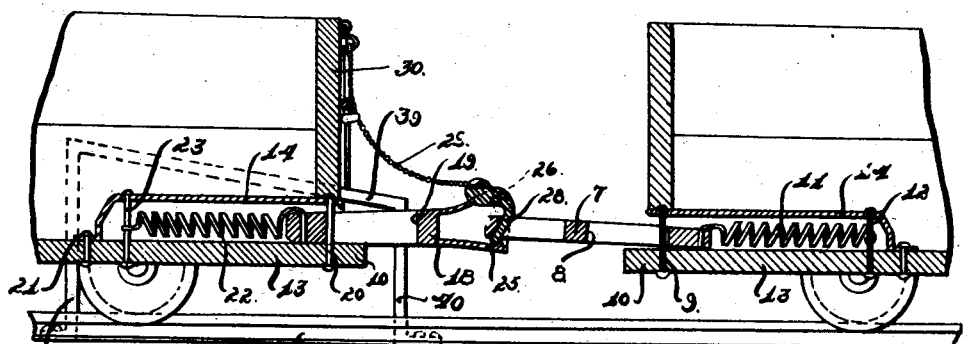

Mounted adjacent the track 38 is a substantially U shaped member 39 having its bight upwardly inclined at one side, as shown in Fig. 1, the leg 40 being shorter than the leg 41. A laterally turned portion 42 of the rod 33 is arranged to engage the bight 39. This U shaped releasing member would be positioned at a location where it would be desired to release the cars from each other. As the car travels along the track and the laterally turned portion 42 engages the inclined bight 39 and rides there along, the rod 33 will be rocked to rock the dog and disengage the cars.

While I have illustrated and described the preferred form of my invention I do not wish to limit myself to the precise details of structure shown, but desire to avail myself of such variations and modifications as come within the scope of the appended claims.

Having thus described my invention what I claim as new and desire to secure by Letters Patent is:

1. In a car coupling mechanism of the class described, adapted for use with a car having an end wall; a rockably mounted coupling pin; a flexible member attached at one end to said coupling pin and at its opposite end to a car with which used, said flexible member, upon being drawn taut, effecting a rocking of said coupling pin to inoperative position; and independent means mounted on said end wall and projecting outwardly from each side thereof, engageable with and disconnected from said flexible member for rendering said flexible member taut.

2. In a car coupling mechanism of the class described, adapted for use with a car having an end wall; a rockably mounted coupling pin; a flexible member attached at one end to said coupling pin and at its opposite end to said end wall, the movement of said flexible member to a taut condition, effecting a rocking of said coupling pin to inoperative position; and a pair of rockably mounted members on said end wall, each projecting outwardly beyond the edge of said end wall adjacent opposite ends and each disconnected from and engageable with said flexible member for, upon rocking in one direction, moving said flexible member to taut condition.

3. In a car coupling mechanism of the class described, adapted for use with a car having an end wall; a rockably mounted coupling pin; a flexible member attached at one end to said coupling pin and at its opposite end to said end wall, the movement of said flexible member to a taut condition, effecting a rocking of said coupling pin to inoperative position; a pair of rockably mounted members on said end wall, each projecting outwardly beyond the edge of said end wall adjacent opposite ends and each disconnected from and engageable with said flexible member for, upon rocking in one direction, moving said flexible member to taut condition; and an inclined bearing member mounted adjacent the side of the roadbed for engaging said rockable members upon passage of the same thereby and rocking the same.

In testimony whereof I have signed the foregoing specification.

JOSEPH WERNIS.